US012125653B2

(12) United States Patent
Yao et al.

(10) Patent No.: US 12,125,653 B2
(45) Date of Patent: Oct. 22, 2024

(54) RELAY

(71) Applicant: BYD COMPANY LIMITED, Guangdong (CN)

(72) Inventors: Baotong Yao, Shenzhen (CN); Lujian Wang, Shenzhen (CN); Siyuan Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 129 days.

(21) Appl. No.: 17/927,307

(22) PCT Filed: Mar. 30, 2021

(86) PCT No.: PCT/CN2021/083922
§ 371 (c)(1),
(2) Date: Nov. 22, 2022

(87) PCT Pub. No.: WO2021/238388
PCT Pub. Date: Dec. 2, 2021

(65) Prior Publication Data

US 2023/0197386 A1 Jun. 22, 2023

(30) Foreign Application Priority Data

May 29, 2020 (CN) ......................... 202020964230.0

(51) Int. Cl.
*H01H 50/20* (2006.01)
*H01H 50/02* (2006.01)
(Continued)

(52) U.S. Cl.
CPC ............ *H01H 50/20* (2013.01); *H01H 50/02* (2013.01); *H01H 50/44* (2013.01); *H01H 50/546* (2013.01)

(58) Field of Classification Search
CPC ........ H01H 50/20; H01H 50/02; H01H 50/44; H01H 50/546; H01H 1/20; H01H 1/54;
(Continued)

(56) References Cited

U.S. PATENT DOCUMENTS 7,737,811 B2 * 6/2010 Trottmann ............. H01H 50/36 335/202
7,859,373 B2 * 12/2010 Yamamoto ........... H01H 50/546 335/131

(Continued)

FOREIGN PATENT DOCUMENTS

CN 103038851 A 4/2013
CN 106486323 A 3/2017

(Continued)

OTHER PUBLICATIONS

International Search Report and Written Opinion for Application No. PCT/CN2021/083922, mailed on Jul. 12, 2021, 9 pages.

*Primary Examiner* — Shawki S Ismail
*Assistant Examiner* — Lisa N Homza

(57) ABSTRACT

A relay, includes: a housing having a cavity in the housing; stationary contacts arranged on the housing, each of the stationary contacts being at least partially in the cavity; a drive shaft movable in an axial direction of the drive shaft, an axial end of the drive shaft having a support piece at least partially inserted into the cavity; a moving contact assembly coupled with the support piece through a sliding structure and movable in the axial direction of the drive shaft, and the sliding structure being arranged on a side of the moving contact assembly along a moving direction of the moving contact assembly; and an elastic member being between the moving contact assembly and the support piece and applying an elastic force to the moving contact assembly.

10 Claims, 10 Drawing Sheets

(51) Int. Cl.
*H01H 50/44* (2006.01)
*H01H 50/54* (2006.01)

(58) Field of Classification Search
CPC ........ H01H 9/30; H01H 50/023; H01H 50/54; H01H 50/64; H01H 50/04
USPC .......................................................... 335/185
See application file for complete search history.

(56) References Cited

U.S. PATENT DOCUMENTS

| | | | | |
|---|---|---|---|---|
| 8,159,321 | B2 * | 4/2012 | Bollinger | H01H 50/546 335/106 |
| 8,289,110 | B2 * | 10/2012 | Niimi | F02N 11/087 335/126 |
| 8,305,169 | B2 * | 11/2012 | Suzuki | F02N 11/087 335/131 |
| 8,786,388 | B2 * | 7/2014 | Ramezanian | F02N 11/087 335/133 |
| 9,203,230 | B2 * | 12/2015 | Ziegler | H01H 50/18 |
| 9,349,560 | B2 * | 5/2016 | Rane | H01H 71/505 |
| 9,761,397 | B1 * | 9/2017 | Weber | H01H 50/64 |
| 11,120,963 | B2 * | 9/2021 | Ziegler | H01H 50/546 |
| 11,410,825 | B2 * | 8/2022 | Engewald | H01H 50/021 |
| 11,670,472 | B2 * | 6/2023 | Zhong | H01H 50/546 335/2 |
| 2009/0322454 | A1 * | 12/2009 | Tanaka | H01H 50/38 335/189 |
| 2009/0322455 | A1 * | 12/2009 | Yoshihara | H01H 51/2209 335/189 |
| 2014/0002215 | A1 * | 1/2014 | Ionescu | H01H 50/18 335/18 |
| 2014/0106209 | A1 * | 4/2014 | Deng | H01M 50/191 429/179 |
| 2014/0106210 | A1 * | 4/2014 | Deng | H01M 50/15 429/179 |
| 2014/0184366 | A1 * | 7/2014 | Ito | H01H 50/54 335/189 |
| 2015/0015350 | A1 * | 1/2015 | Tachikawa | H01H 50/18 335/131 |
| 2015/0022292 | A1 * | 1/2015 | Tachikawa | H01H 50/641 335/131 |
| 2015/0213980 | A1 * | 7/2015 | Lee | H01H 50/10 335/185 |
| 2015/0213981 | A1 * | 7/2015 | Choi | H01H 51/065 335/185 |
| 2015/0213982 | A1 * | 7/2015 | Lim | H01H 50/54 335/196 |
| 2018/0197710 | A1 * | 7/2018 | Yao | H01H 85/2045 |
| 2019/0006140 | A1 * | 1/2019 | Shi | H01H 50/546 |
| 2019/0074151 | A1 * | 3/2019 | Huang | H01H 50/58 |
| 2019/0148095 | A1 * | 5/2019 | Minowa | H01H 50/14 335/185 |
| 2020/0294747 | A1 * | 9/2020 | Yao | H01H 50/58 |
| 2020/0321178 | A1 * | 10/2020 | Huang | H01H 50/14 |
| 2020/0373111 | A1 * | 11/2020 | Zhong | H01H 50/541 |
| 2021/0175031 | A1 * | 6/2021 | Yoo | H01H 50/36 |
| 2022/0122792 | A1 * | 4/2022 | Zhou | H01H 50/546 |
| 2023/0230789 | A1 * | 7/2023 | Yao | H01H 50/02 335/185 |
| 2024/0021388 | A1 * | 1/2024 | Yao | H01H 50/021 |

FOREIGN PATENT DOCUMENTS

| | | | |
|---|---|---|---|
| CN | 108400061 | A | 8/2018 |
| CN | 109727818 | A | 5/2019 |
| CN | 110349811 | A | 10/2019 |
| CN | 210006676 | U | 1/2020 |
| CN | 210136823 | U | 3/2020 |
| CN | 211980527 | U | 11/2020 |
| DE | 102016011341 | A1 | 3/2017 |
| DE | 102018124970 | A1 | 5/2019 |
| EP | 4141903 | A1 | 3/2023 |
| JP | 2012-022982 | A | 2/2012 |
| KR | 20190089438 | A | 7/2019 |

* cited by examiner

RELAY

CROSS-REFERENCE TO RELATED APPLICATIONS

This application is a National Phase Application of International Patent Application No. PCT/CN2021/083922 filed with the China National Intellectual Property Administration (CNIPA) on Mar. 30, 2021, which is based on and claims priority to and benefits of Chinese Patent Application No. 202020964230.0, filed by BYD Company Limited. on May 29, 2020 and entitled “RELAY”. The entire content of all of the above-identified applications is incorporated herein by reference.

FIELD

The present disclosure relates to the technical field of electrical equipment, and more specifically to a relay.

BACKGROUND

A relay is a switching device for a high-voltage and high-power power supply. When a moving contact contacts a stationary contact, the high voltage is switched on. A housing of the relay is generally filled with arc extinguishing gas to achieve arc extinction. However, in related arts, due to the structural limitation of the relay, a backflow effect of the arc extinguishing gas is poor, and the arc extinguishing effect is poor.

SUMMARY

The present disclosure resolves at least one of the technical problems existing in the related art. In view of this, the present disclosure provides a relay, where a sliding structure is arranged on a side of the moving contact assembly in a moving direction, which may leave the space on one side of the moving contact assembly facing the stationary contact vacant, so that arc extinguishing gas flows smoothly.

The relay according to an embodiment of the present disclosure includes: a housing, where a cavity is defined in the housing; a number of stationary contacts, where the stationary contacts are arranged on the housing at intervals, and each of the stationary contacts is at least partially arranged in the cavity; a drive shaft, where the drive shaft is movable relative to the housing in an axial direction of the drive shaft, and an axial end of the drive shaft is provided with a support piece at least partially inserted into the cavity; a moving contact assembly, where the moving contact assembly is matched with the support piece through the sliding structure, so that the moving contact assembly is movable relative to the support piece in an axial direction of the drive shaft between a first position contacting the stationary contact and a second position away from the stationary contact, and the sliding structure is arranged on a side of the moving contact assembly in a moving direction; and an elastic member, where the elastic member is arranged between the moving contact assembly and the support piece to apply an elastic force to the moving contact assembly to move toward the first position.

In the relay according to an embodiment of the present disclosure, the sliding structure is arranged on the side of the moving contact assembly in the moving direction. The elastic member is arranged between the moving contact assembly and the support piece. Thus may make the space on the side of the moving contact assembly facing the stationary contact leave vacant, so that the arc extinguishing gas flows smoothly, and at the same time, when the relay is switched on, a large contact force may be maintained between the moving contact assembly and the stationary contact.

In some embodiments of the present disclosure, the sliding structure includes a sliding slot and a sliding block. One of the support piece and the moving contact assembly defines the sliding slot and includes a first stop wall and a second stop wall respectively located at two ends of the sliding slot. The sliding slot extends in the axial direction of the drive shaft. The sliding block is arranged on the other of the support piece and the moving contact assembly. The sliding block is matched with the sliding slot and therefore slidable between the first stop wall and the second stop wall in the axial direction of the drive shaft.

In some embodiments of the present disclosure, the sliding slot is formed on the support piece. The sliding block is arranged on the moving contact assembly. When the sliding block contacts the first stop wall under an elastic force of the elastic member, the moving contact is arranged in the first position.

In some embodiments of the present disclosure, the support piece is provided with two supporting arms. The two supporting arms are arranged opposite to each other. Each of the supporting arms is respectively formed with the sliding slot thereon. The moving contact assembly is arranged between the two supporting arms. The sliding blocks are respectively arranged on two sides of the moving contact assembly facing the two supporting arms.

In some embodiments of the present disclosure, the relay further includes a first magnetic yoke. The moving contact assembly includes a moving contact and a second magnetic yoke. The first magnetic yoke is arranged on a side of the moving contact facing the stationary contact. The second magnetic yoke is arranged on a side of the moving contact facing away from the stationary contact.

In some embodiments of the present disclosure, the first magnetic yoke is arranged in the cavity and spaced apart from the stationary contact. The moving contact is mounted to the second magnetic yoke. The second magnetic yoke is matched with the support piece through the sliding structure. The elastic member is stopped between the second magnetic yoke and the support piece.

In some embodiments of the present disclosure, the support piece defines a sliding cavity opened toward the first magnetic yoke. The moving contact assembly is movably matched with the sliding cavity. An end of the first magnetic yoke facing the moving contact assembly does not extend out of an end of the stationary contact facing the moving contact assembly. A distance between the end of the first magnetic yoke facing the moving contact assembly and the end of the stationary contact facing the moving contact assembly in an axial direction of the drive shaft is L, and the L satisfies: $0 \le L \le 1$ mm.

In some embodiments of the present disclosure, the second magnetic yoke includes a bottom plate piece and two side plate pieces. The two side plate pieces are oppositely arranged on two sides of the bottom plate piece. A mounting groove is defined between the two side plate pieces and the bottom plate piece. The moving contact is arranged in the mounting groove. The distance between the end of the first magnetic yoke facing the moving contact assembly and the end of the stationary contact facing the moving contact assembly in a length direction of the drive shaft is L, and the L satisfies: $0 \le L \le 1$ mm.

In some embodiments of the present disclosure, the moving contact is provided with one of a matching protrusion and a matching groove, and the bottom plate piece is provided with other of the matching protrusion and the matching groove. The matching protrusion is in an interference fit with the matching groove.

In some embodiments of the present disclosure, the drive shaft further includes a shaft body piece and an insulating member. The insulating member is connected between the support piece and the shaft body piece.

In some embodiments of the present disclosure, a mounting through hole is formed on the support piece. The insulating member is matched with the mounting through hole.

A positioning member is arranged on an end of the insulating member away from the shaft body piece to position the elastic member.

A portion of the additional aspects and advantages of the present disclosure are given in the following description, and become apparent in the following description or may be learned through the practice of the present disclosure.

Figure 1:
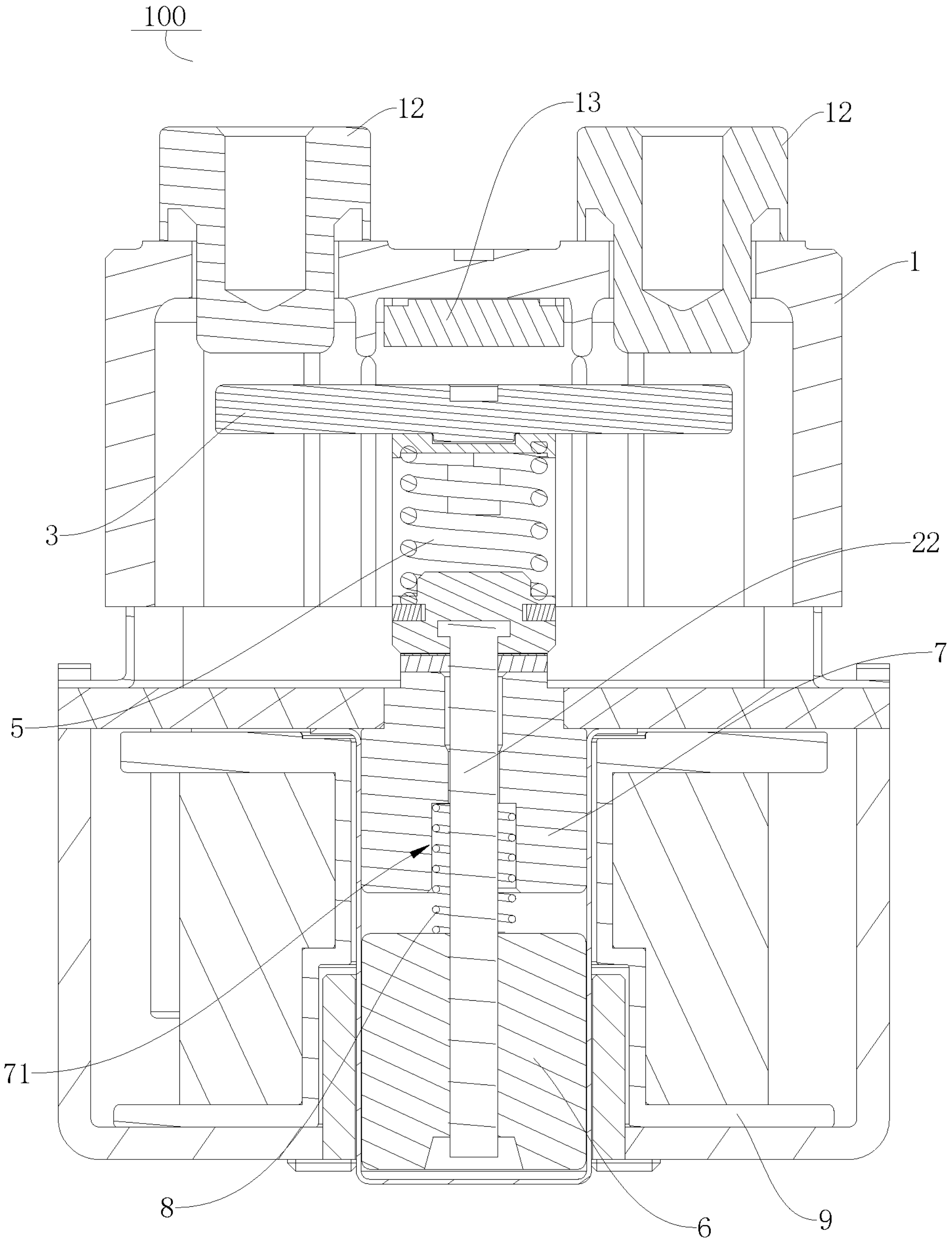
FIG. 1 is a front sectional view of a relay according to an embodiment of the present disclosure.

REFERENCE NUMERALS:

Relay 100;

Housing 1; cavity 11; stationary contact 12; first magnetic yoke 13;

Drive shaft 2;

Support piece 21; supporting arm 211; sliding cavity 212; mounting through hole 213;

Shaft body piece 22; insulating member 23; positioning member 231;

Moving contact assembly 3; moving contact 31; matching protrusion 311; second magnetic yoke 32; bottom plate piece 321; side plate piece 322; mounting groove 323;

Sliding structure 4; sliding slot 41; first stop wall 411; second stop wall 412; sliding block 42;

Elastic member 5;

Magnetic member 6;

Limiting member 7; limiting hole 71;

Buffer spring 8; and coil 9.

DETAILED DESCRIPTION

Embodiments of the present disclosure are described in detail below, and examples of the embodiments are shown in the accompanying drawings, where the same or similar elements or the elements having same or similar functions are denoted by the same or similar reference numerals throughout the description. The embodiments described below with reference to the accompanying drawings are exemplary to explain the present disclosure and cannot be construed as a limitation to the present disclosure.

The disclosure below provides many different embodiments or examples for implementing different structures of the present disclosure. To simplify the present disclosure, components and settings of specific examples are described below. Certainly, they are merely examples, and are not to limit the present disclosure. In addition, reference numerals and/or letters may be repeated in different examples in the present disclosure. Such repetitions are for simplification and clarity, which do not indicate relationships between the embodiments and/or settings discussed. In addition, the present disclosure provides examples of various specific processes and materials, but a person of ordinary skill in the art may be aware of the applicability of other processes and/or the use of other materials.

Figure 2:
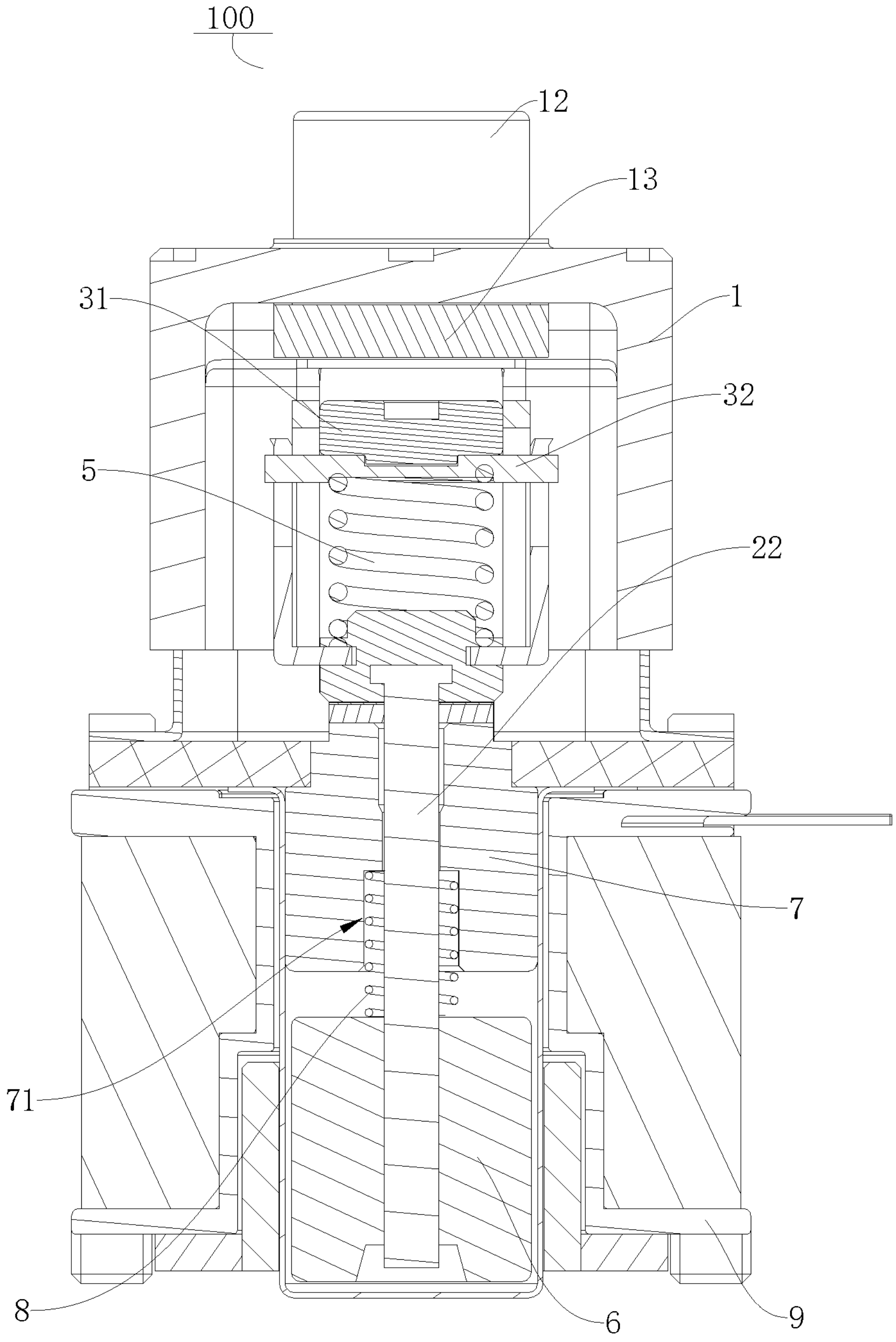
FIG. 2 is a side sectional view of a relay according to an embodiment of the present disclosure.
Figure 3:
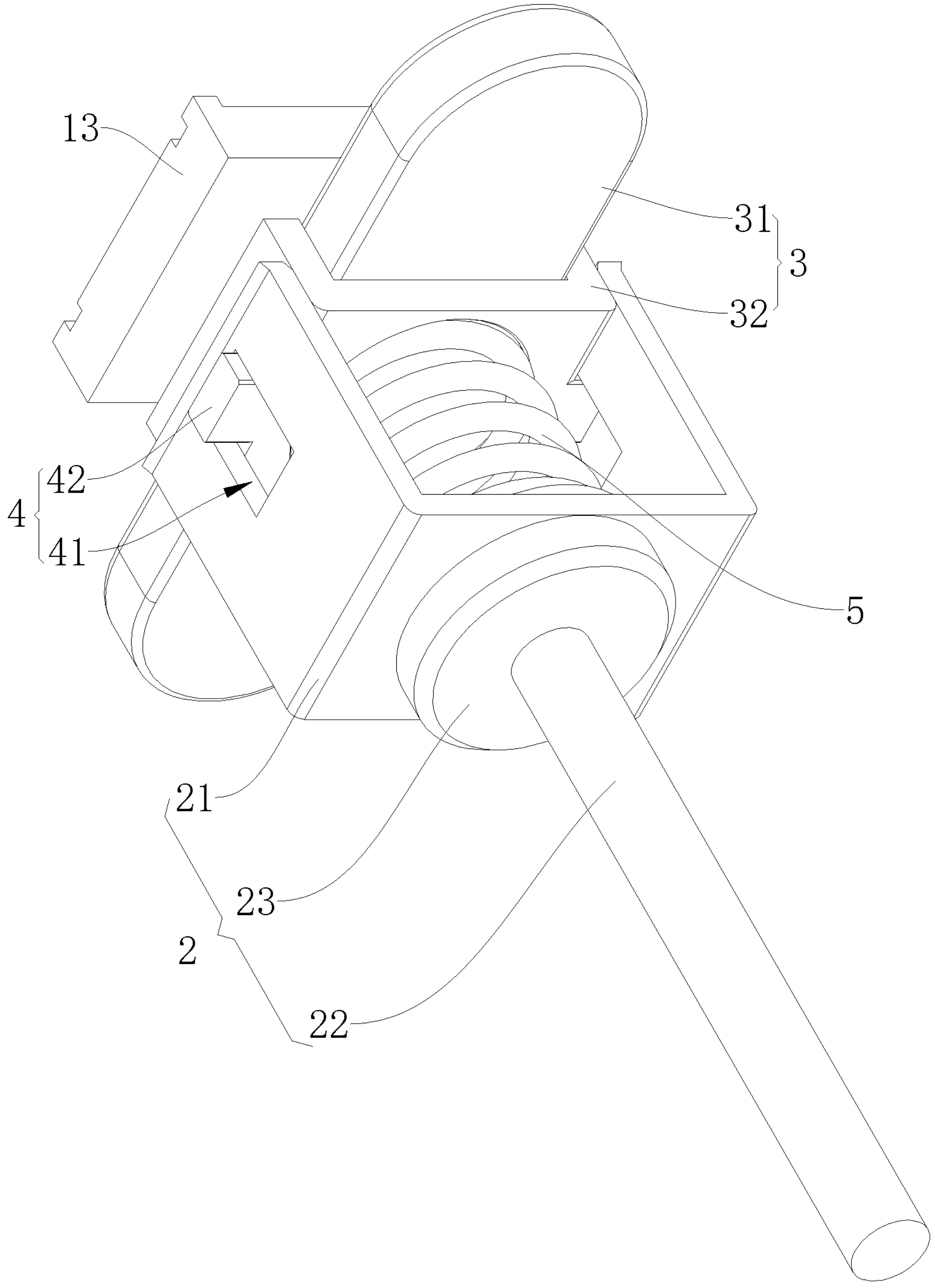
FIG. 3 is a perspective schematic view of a partial structure of a relay according to an embodiment of the present disclosure.

Referring to FIG. 1-FIG. 3, a relay 100 according to an embodiment of the present disclosure may include a housing 1, a stationary contact 12, a first magnetic yoke 13, a drive shaft 2, a moving contact assembly 3, a sliding structure 4, an elastic member 5, a magnetic member 6, a limiting member 7, a buffer spring 8, and a coil 9.

Referring to FIG. 1, a cavity 11 is defined in the housing 1. The cavity 11 is filled with arc extinguishing gas such as hydrogen. A number of stationary contacts 12 are arranged on the housing 1 at intervals, and at least partially arranged in the cavity 11. In other words, each stationary contact 12 can be partially arranged in the cavity 11, or can be wholly arranged in the cavity 11. For example, the housing 1 may be a ceramic housing. The ceramic housing may have a high-voltage insulation effect, so that components such as the stationary contact 12 in the relay 100 may be prevented from being damaged or broken by the high voltage in the housing 1, thereby improving the safety and reliability of the relay 100.

Referring to FIG. 3, the drive shaft 2 is movable relative to the housing 1 in an axial direction of the drive shaft 2. An axial end of the drive shaft 2 is provided with a support piece 21 at least partially inserted into the cavity 11. The moving contact assembly 3 is matched with the support piece 21 through the sliding structure 4, so that the moving contact assembly 3 is movable relative to the support piece 21 in the axial direction of the drive shaft 2 between a first position (referring to the position of the moving contact assembly 3 in FIG. 5) contacting the stationary contact 12 and a second position (referring to the position of the moving contact assembly 3 in FIG. 7) away from the stationary contact 12. The sliding structure 4 is arranged on a side of the moving contact assembly 3 in the moving direction. The elastic member 5 is arranged between the moving contact assembly 3 and the support piece 21 to apply an elastic force to the moving contact assembly 3 to move towards the first position. For example, as shown in FIG. 1, the elastic member 5 is a spring. The elastic member 5 always applies an upward force to the moving contact assembly 3.

Figure 7:
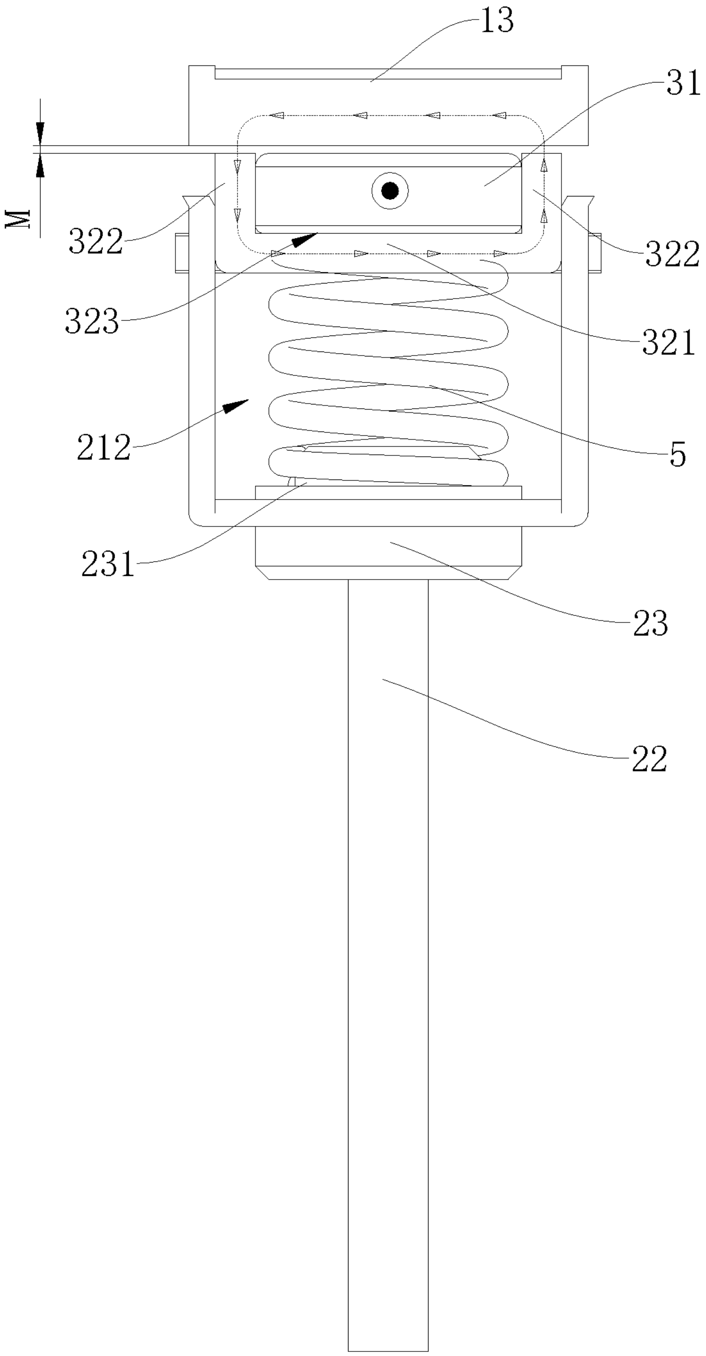
FIG. 7 is a schematic diagram of an attraction force of a first magnetic yoke and a second magnetic yoke according to an embodiment of the present disclosure, where a gap M between the first magnetic yoke and the second magnetic yoke is not zero.
Figure 9:
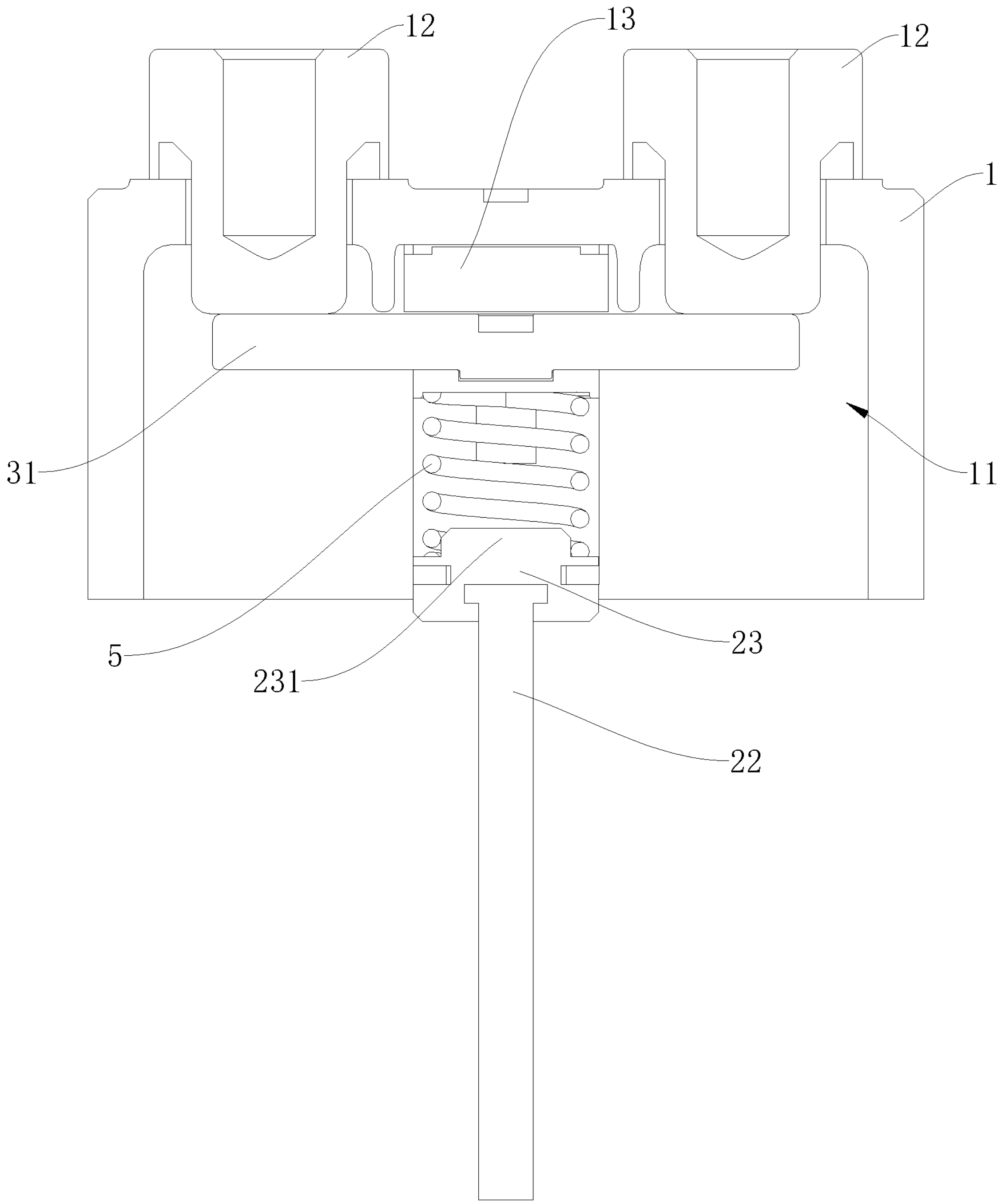
FIG. 9 is a partial schematic diagram of a relay according to an embodiment of the present disclosure, where the relay is in an on state.

Specifically, referring to FIG. 7 and FIG. 9, when the moving contact assembly 3 is driven by the drive shaft 2 to move to contact the stationary contact 12, the moving contact 31 is electrically communicated with the stationary contact 12, and the relay 100 is switched on. At this time, due to the contact force between the moving contact assembly 3 and the stationary contact 12, the moving contact assembly 3 moves to the second position, and the elastic member 5 is further compressed, thereby achieving overrun, and facilitating to maintain a large contact force between the moving contact assembly 3 and the stationary contact 12. When the moving contact assembly 3 is driven by the drive shaft 2 to move away from the stationary contact 12 to be separated from the stationary contact 12, referring to FIG. 5, there is no conduction between the moving contact 31 and the stationary contact 12. The elastic member 5 returns to the first position. The relay 100 is switched off.

It should be noted that in the related art, a limiting component is arranged on the side of the moving contact facing the stationary contact so as to limit the movement of the moving contact to the stationary contact. The limiting component occupies the space on the side of the moving contact facing the stationary contact and blocks the arc extinguishing gas flow, which affects the arc extinguishing effect, so that a lateral arc blowing manner can only be used. However, even if the lateral arc blowing manner is used for the arc extinction, a backflow effect of the arc blowing gas is poor due to the blocking of the limiting component.

However, in the present disclosure, the sliding structure 4 is arranged on the side of the moving contact assembly 3 along the moving direction, which may leave the space on the side of the moving contact assembly 3 facing the stationary contact 12 vacant, so that the arc extinguishing gas flows smoothly.

In view of this, in the relay 100 according to an embodiment of the present disclosure, the sliding structure 4 is arranged on the side of the moving contact assembly 3 along the moving direction, and the elastic member 5 is arranged between the moving contact assembly 3 and the support piece 21, thus the space on the side of the moving contact assembly 3 facing the stationary contact 12 is vacant, so that the arc extinguishing gas flows smoothly. At the same time, when the relay 100 is switched on, overrun can be achieved, which is conducive to maintaining a large contact force between the moving contact assembly 3 and the stationary contact 12.

Figure 4:
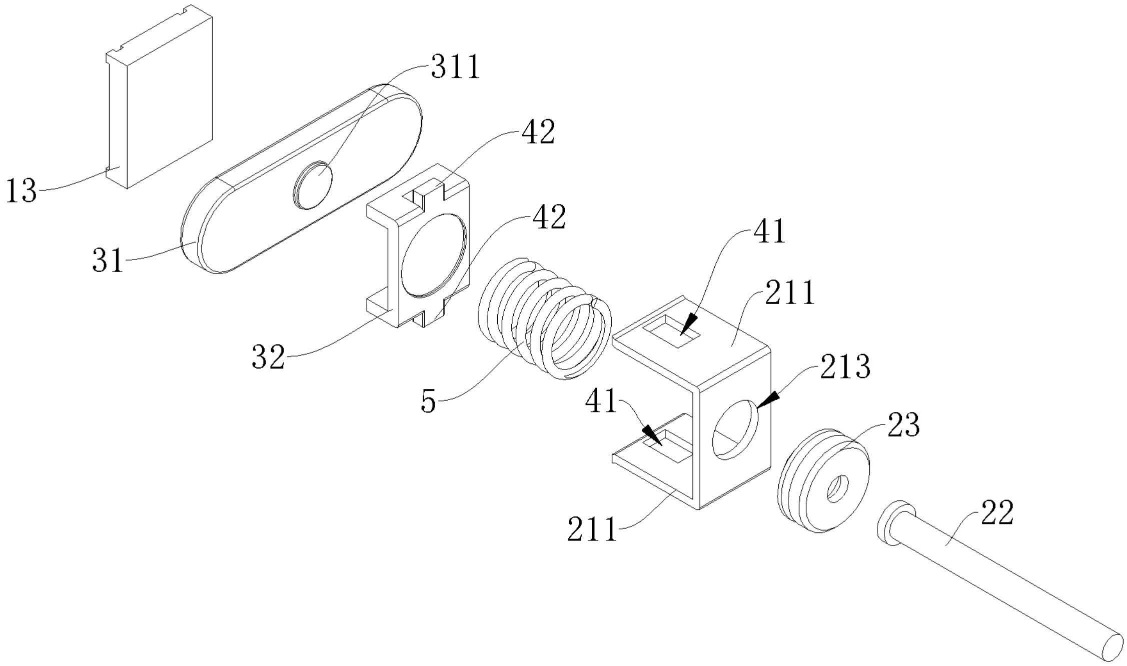
FIG. 4 is an exploded schematic view of FIG. 3.

In some embodiments of the present disclosure, referring to FIG. 3 and FIG. 4, the sliding structure 4 includes a sliding slot 41 and a sliding block 42. The sliding slot 41 is formed on one of the support piece 21 and the moving contact assembly 3, extends in the axial direction of the drive shaft 2, and includes a first stop wall 411 and a second stop wall 412 respectively located at two ends of the sliding slot 41 along the extension direction (referring to FIG. 6). The sliding block 42 is arranged on the other one of the support piece 21 and the moving contact assembly 3. The sliding block 42 is matched with the sliding slot 41 and slides between the first stop wall 411 and the second stop wall 412 in the axial direction of the drive shaft 2. Thus, it is conducive to ensure the reliability of the movement of the moving contact assembly 3 relative to the support piece 21 in the axial direction of the drive shaft 2 between the first position and the second position. Moreover, the structure is simple, and the production cost is low.

Figure 6:
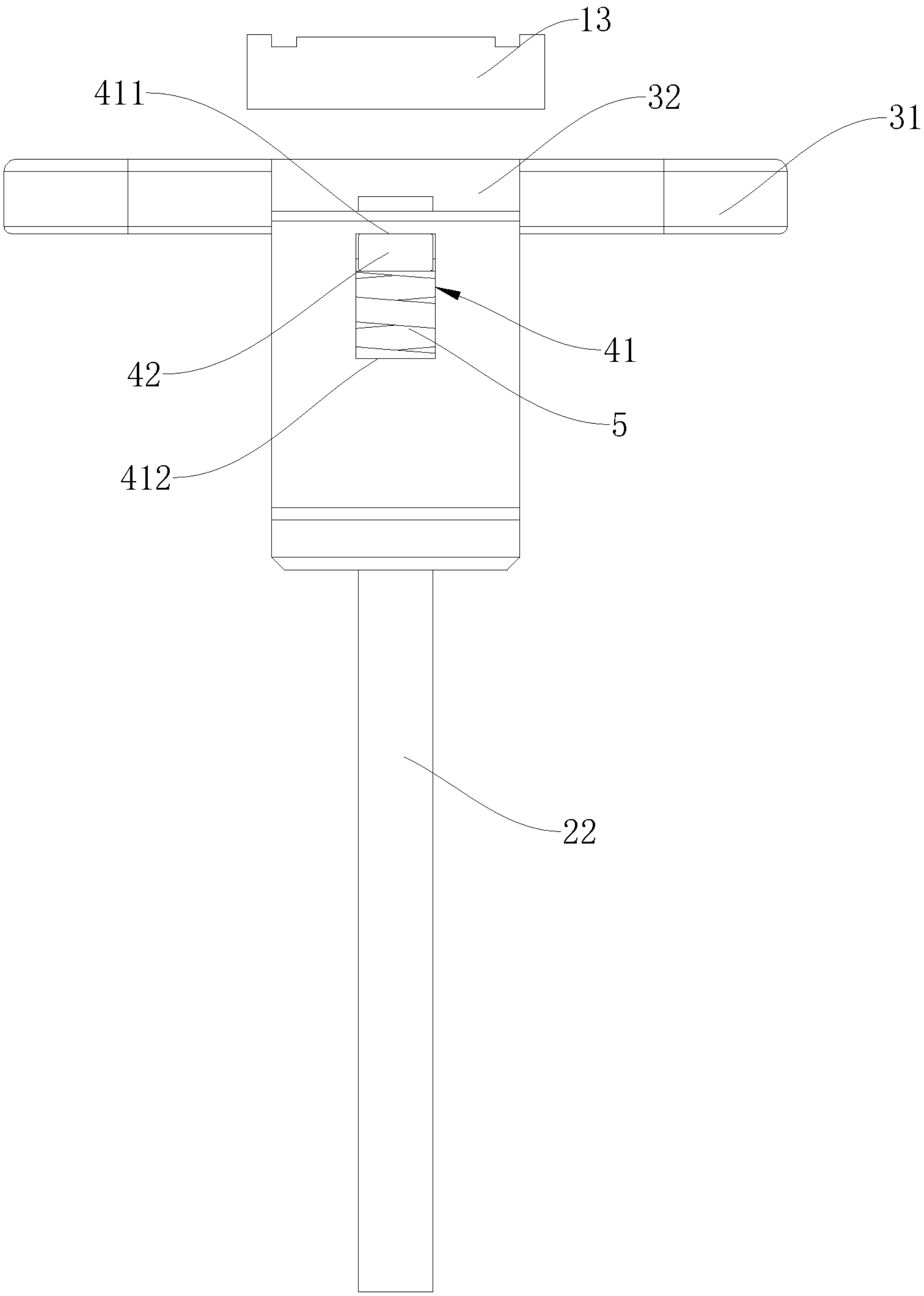
FIG. 6 is a side view according to FIG. 5.

In some embodiments of the present disclosure, referring to FIG. 3 and FIG. 6, the sliding slot 41 is formed on the support piece 21. The sliding block 42 is arranged on the moving contact assembly 3. When the sliding block 42 contacts the first stop wall 411 under an elastic force of the elastic member 5 (referring to FIG. 6), the moving contact 31 is located at the first position. Thus, the first stop wall 411 may limit the continuous movement of the moving contact assembly 3 towards the stationary contact 12, which is conducive to ensuring the operation reliability of the relay 100. Furthermore, compared with the conventional relay 100, since a contact area between the sliding block 42 and the first stop wall 411 is small, when the relay 100 is switched off, the impacting noise generated between a support and the sliding block 42 may be reduced, which is conducive to improving the user experience.

For example, when the sliding block 42 moves a certain distance from the first position towards the second stop wall 412, the moving contact assembly 3 reaches the second position (referring to FIG. 7). In the second position, the sliding block 42 is arranged between the first stop wall 411 and the second stop wall 412 and spaced apart from the first stop wall 411 and the second stop wall 412 respectively, so that when the relay 100 is switched from the off state to the on state, a buffer effect to the impact of the elastic member 5 between the moving contact assembly 3 and the stationary contact 12 may be ensured, thereby reducing the wear and deformation of the moving contact assembly 3 and the stationary contact 12, and facilitating the prolonging of the service life of the relay 100.

Figure 5:
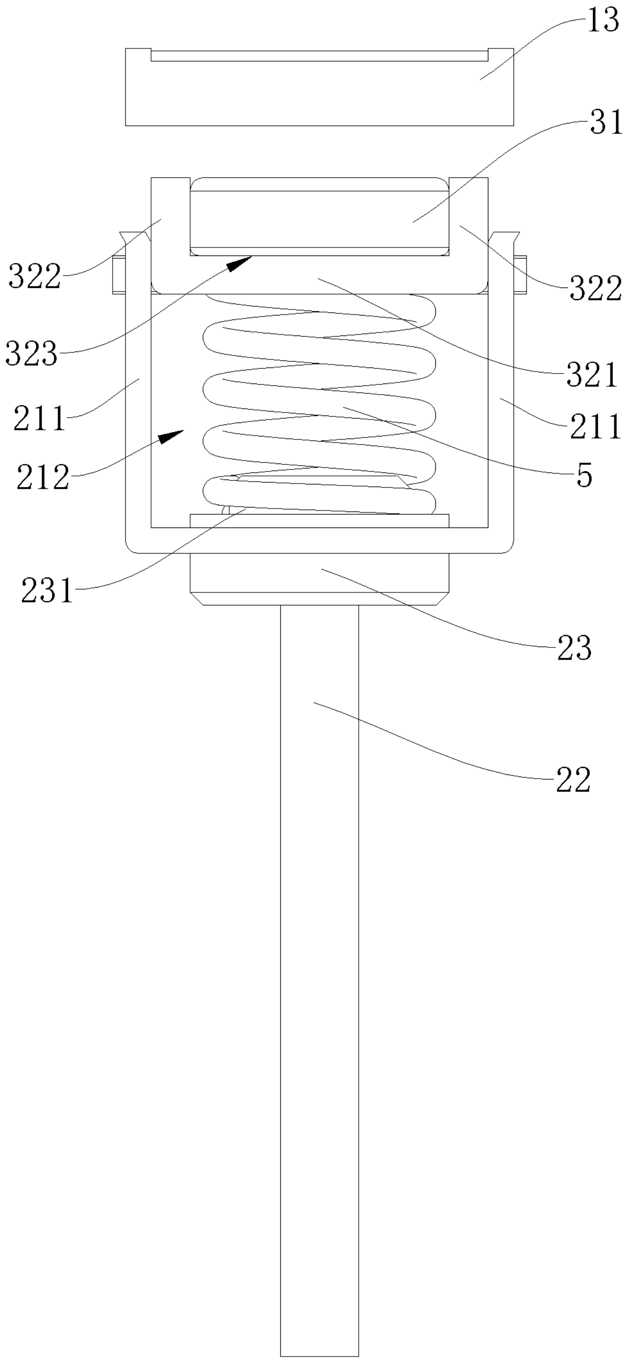
FIG. 5 is a front schematic view of a partial structure of a relay according to an embodiment of the present disclosure.

In some embodiments of the present disclosure, referring to FIG. 4 and FIG. 5, the support piece 21 is provided with two supporting arms 211. The two supporting arms 211 are arranged opposite to each other. Each supporting arm 211 is provided with the sliding slot 41. The moving contact assembly 3 is arranged between the two supporting arms 211. The sliding blocks 42 are respectively arranged on the two sides of the moving contact assembly 3 facing the two supporting arms 211. It may be appreciated that the two sliding slots 41 are correspondingly matched with the two sliding blocks 42, which is conducive to further ensuring the reliability of the movement of the moving contact assembly 3 relative to the support piece 21 in the axial direction of the drive shaft 2 between the first position and the second position. Moreover, the structure of the support piece 21 is further simplified, which is conducive to reducing the cost.

The relay 100 further includes a first magnetic yoke 13. The moving contact assembly 3 includes a moving contact 31 and a second magnetic yoke 32. The first magnetic yoke 13 and the second magnetic yoke 32 are respectively arranged on two sides of the moving contact 31. When the moving contact assembly 3 is arranged in the first position, a magnetic attraction force is generated between the first magnetic yoke 13 and the second magnetic yoke 32. Specifically, the first magnetic yoke 13 is arranged on a side of the moving contact 31 facing the stationary contact 12, and the second magnetic yoke 32 is arranged on a side of the moving contact 31 facing away from the stationary contact 12. When the moving contact assembly 3 is arranged in the first position, the moving contact 31 contacts at least two stationary contacts 12 to conduct the corresponding stationary contacts 12. The electric current flows through the moving contact 31 to generate a magnetic field around the moving contact 31. The first magnetic yoke 13 and the second magnetic yoke 32 are magnetized, and the first magnetic yoke 13 and the second magnetic yoke 32 are different in magnetism. The magnetic attraction force is generated between the first magnetic yoke 13 and the second magnetic yoke 32. The moving contact 31 is pushed by the second magnetic yoke 32 towards the stationary contact 12 to resist a repulsive force generated when the moving contact 31 contacts and communicates with the stationary contact 12. The contact pressure between the moving contact 31 and the stationary contact 12 is increased, so that the contact stability between the moving contact 31 and the stationary contact 12 is improved, and the operation stability of the relay 100 is ensured.

In some embodiments of the present disclosure, referring to FIG. 1 and FIG. 5, the first magnetic yoke 13 is arranged in the cavity 11 and spaced apart from the stationary contact 12. The moving contact 31 is mounted to the second magnetic yoke 32. The second magnetic yoke 32 is matched with the support piece 21 through the sliding structure 4. The elastic member 5 is limited between the second magnetic yoke 32 and the support piece 21. For example, as shown in FIG. 1, the top of the housing 1 is provided with two stationary contacts 12 spaced apart. The first magnetic yoke 13 is arranged in the cavity 11 between the two stationary contacts 12.

It may be understood that when the relay 100 is in the on state, the moving contact 31 is electrically communicated with the stationary contact 12. For example, referring to FIG. 7, the outward electric current perpendicular to the plane flows through the moving contact 31, so that a magnetic field in a counterclockwise direction around the moving contact 31 is generated. The moving contact 31 is arranged between the first magnetic yoke 13 and the second magnetic yoke 32. The first magnetic yoke 13 and the second magnetic yoke 32 are magnetized, and the first magnetic yoke 13 and the second magnetic yoke 32 attract each other. Because the first magnetic yoke 13 is fixed on the housing 1, the moving contact 31 is pushed by the second magnetic yoke 32 in the direction of approaching the stationary contact 12 under the magnetic attraction force of the first magnetic yoke 13, so that a pressing force towards the first magnetic yoke 13 is provided by the second magnetic yoke 32 for the moving contact 31, thereby effectively counteracting the electric-shock repulsive force between the moving contact 31 and the stationary contact 12, increasing the contact pressure between the moving contact 31 and the stationary contact 12, and making the contact between the moving contact 31 and the stationary contact 12 more stable.

In some embodiments, the housing 1 is a ceramic housing. The first magnetic yoke 13 is welded to the housing 1. A welding force between the first magnetic yoke 13 and the housing 1 is far greater than an electromagnetic force between the moving contact 31 and the stationary contact 12, so that the first magnetic yoke 13 is fixed relative to the housing 1. It may be appreciated that, compared with the related art in which the first magnetic yoke is arranged on the moving contact assembly, the weight of the moving contact assembly 3 may be reduced, the operating voltage of the relay 100 is reduced, and the operating efficiency is improved. In addition, the size of the first magnetic yoke 13 and the second magnetic yoke 32 may be greater, which further facilitates the stable contact between the moving contact 31 and the stationary contact 12 when the relay 100 is in the on state, and also facilitates the improvement of the heat dissipation capacity of the first magnetic yoke 13 and the second magnetic yoke 32.

Figure 10:
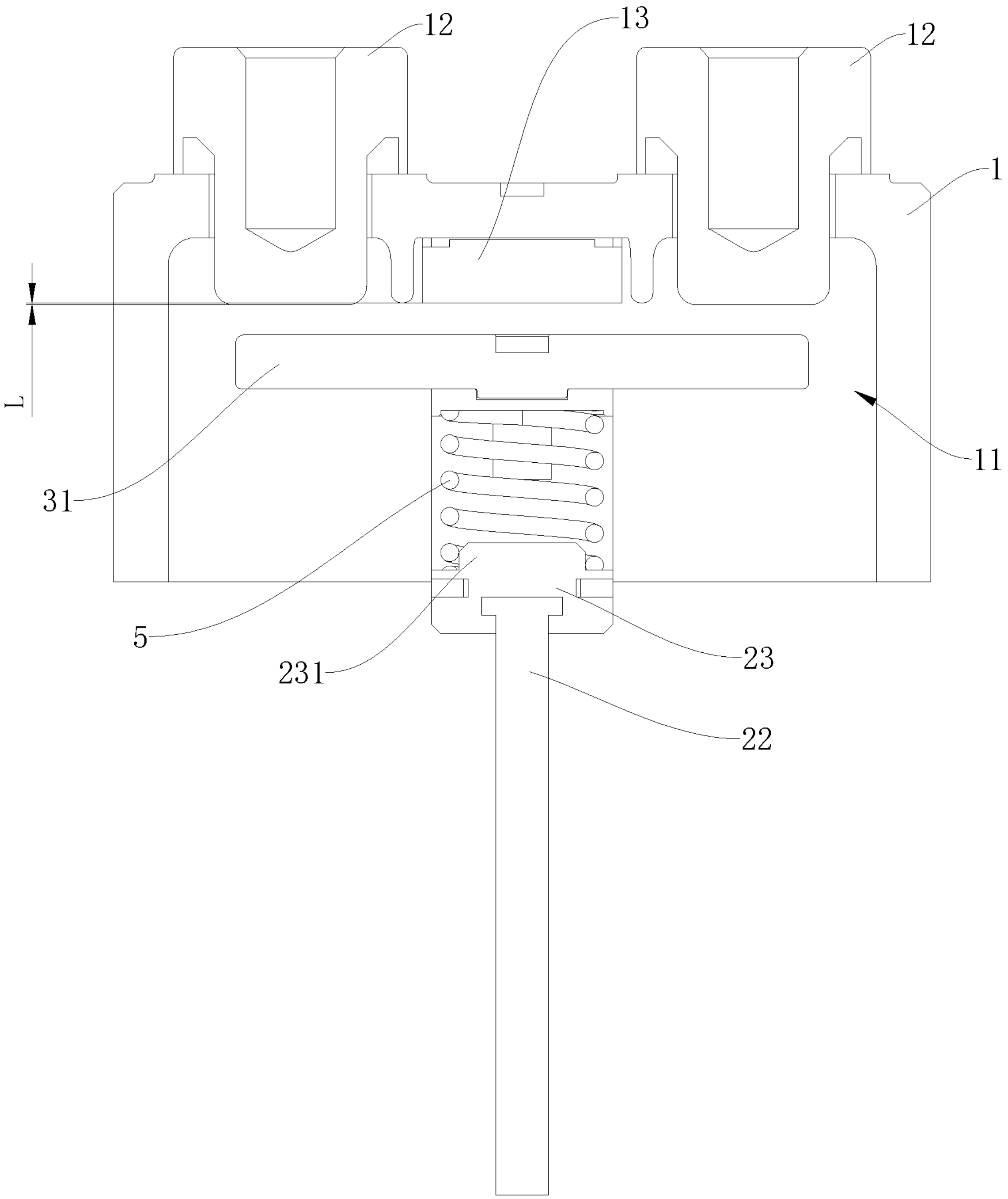
FIG. 10 is a partial schematic diagram of a relay according to an embodiment of the present disclosure, where the relay is in an off state.

In some embodiments of the present disclosure, referring to FIG. 7, the support piece 21 defines a sliding cavity 212 opened toward the first magnetic yoke 13. The moving contact assembly 3 is movably matched with the sliding cavity 212. Referring to FIG. 10, an end of the first magnetic yoke 13 facing the moving contact assembly 3 does not extend out of an end of the stationary contact 12 facing the moving contact assembly 3. A distance between the end of the first magnetic yoke 13 facing the moving contact assembly 3 and the end of the stationary contact 12 facing the moving contact assembly 3 in the axial direction of the drive shaft 2 is L, and the L satisfies: $0 \leq L \leq 1$ mm. For example, the L may be 0.02 mm, 0.04 mm, 0.06 mm, 0.08 mm, 0.1 mm, 0.12 mm, 0.14 mm, 0.16 mm, 0.18 mm, 0.2 mm, 0.25 mm, 0.3 mm, 0.4 mm, 0.5 mm, 0.6 mm, 0.7 mm, 0.8 mm, 0.9 mm, etc.

Thus, when the moving contact 31 is electrically communicated with the stationary contact 12 (referring to FIG. 9), on the one hand, the interference between the first magnetic yoke 13 and the moving contact 31 may be avoided, and on the other hand, a gap M between the first magnetic yoke 13 and the second magnetic yoke 32 (referring to FIG. 7) may be relatively small, which is conducive to ensuring the contact pressure between the moving contact 31 and the stationary contact 12, so that the contact between the moving contact 31 and the stationary contact 12 is stable.

In some embodiments of the present disclosure, as shown in FIG. 7, the second magnetic yoke 32 includes a bottom plate piece 321 and two side plate pieces 322. The two side plate pieces 322 are oppositely arranged on two sides of the bottom plate piece 321. A mounting groove 323 is defined between the two side plate pieces 322 and the bottom plate piece 321. The moving contact 31 is arranged in the mounting groove 323. The end of the moving contact 31 facing the stationary contact 12 is flush with an end of the side plate piece 322 facing the first magnetic yoke 13. Thus, when the moving contact 31 is electrically communicated with the stationary contact 12, it is conducive to increasing a utilization ratio of a magnetic conductive section between the first magnetic yoke 13 and the second magnetic yoke 32, and also conducive to making the first magnetic yoke 13 and the second magnetic yoke 32 be in zero-gap contact. The contact pressure between the moving contact 31 and the stationary contact 12 is further increased, so that the contact between the moving contact 31 and the stationary contact 12 is more stable.

Of course, the present disclosure is not limited thereto. The end of the moving contact 31 facing the stationary contact 12 may not be flush with the end of the side plate piece 322 facing the first magnetic yoke 13. In other words, the end of the moving contact 31 facing the stationary contact 12 may exceed out of or be lower than the end of the side plate piece 322 facing the first magnetic yoke 13, as long as the gap M between the first magnetic yoke 13 and the second magnetic yoke 32 is ensured to be between 0-1 mm when the moving contact 31 is electrically communicated with the stationary contact 12.

Figure 8:
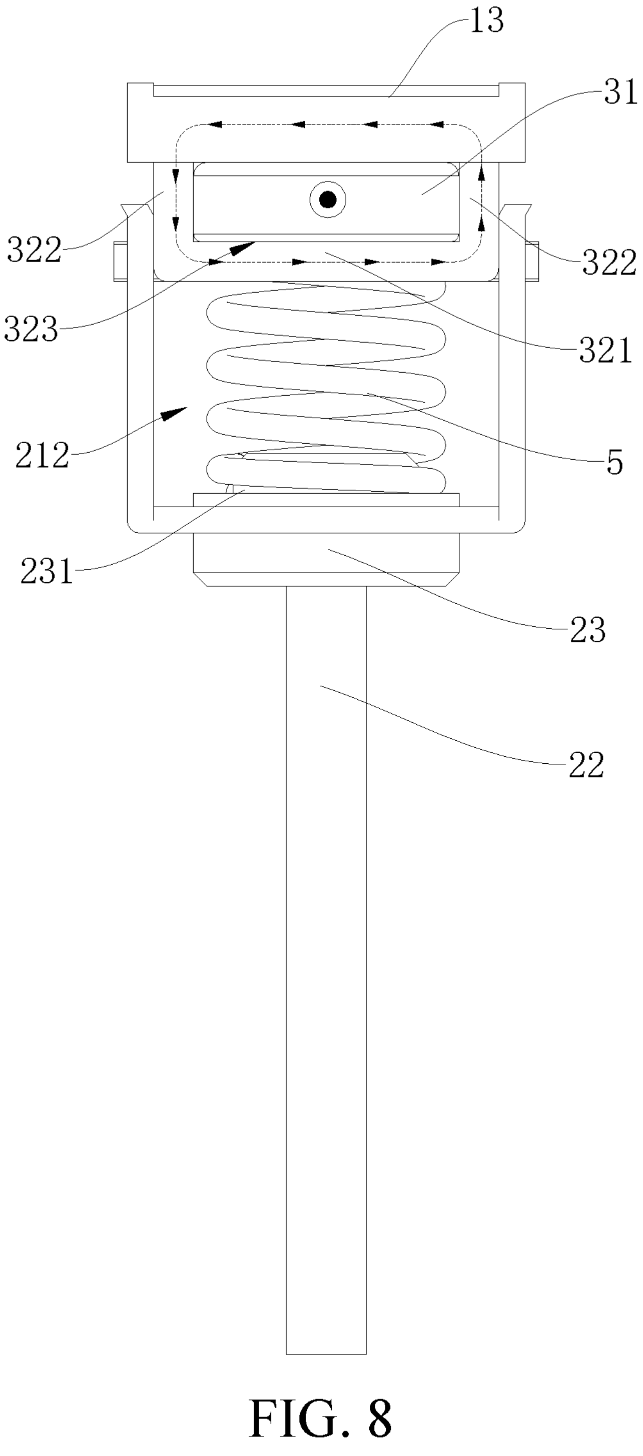
FIG. 8 is a schematic diagram of an attraction force of a first magnetic yoke and a second magnetic yoke according to another embodiment of the present disclosure, where a gap between the first magnetic yoke and the second magnetic yoke is zero.

In an embodiment, as shown in FIG. 8, the gap M between the first magnetic yoke 13 and the second magnetic yoke 32 is zero when the moving contact 31 is electrically communicated with the stationary contact 12, thereby facilitating a further increase of the utilization ratio of the magnetic conductive section between the first magnetic yoke 13 and the second magnetic yoke 32, resulting in more stable contact between the moving contact 31 and the stationary contact 12.

In some examples, as shown in FIG. 8, each side plate piece 322 is perpendicular to the bottom plate piece 321. The second magnetic yoke 32 wraps a bottom surface and two opposite side walls of the moving contact 31. Of course, the present disclosure is not limited thereto. The two side plate pieces 322 may incline towards the center of the moving contact 31, thereby facilitating the improvement of the connection reliability between the second magnetic yoke 32 and the moving contact 31.

In an embodiment, as shown in FIG. 3, the moving contact 31 is formed in a plate-like shape. Two lengthwise ends of the moving contact 31 extend out of the mounting groove 323 respectively. The two lengthwise ends of the moving contact 31 contact the two stationary contacts 12 respectively when the relay 100 is in the on state.

It may be understood that since zero gap may be achieved between the first magnetic yoke 13 and the second magnetic yoke 32 in the present disclosure, it may be theoretically calculated that when the electric current of 5000 A flows through the moving contact 31, the additionally increased pressure between the moving contact 31 and the stationary contact 12 may be 20 N, which can effectively resist the repulsive force between the moving contact 31 and the stationary contact 12 in a short circuit process, so that the product failure caused by the arcing of the moving contact 31 and the stationary contact 12 of the relay 100 is prevented. Meanwhile, when the rated current flows through the relay 100, the increased contact pressure may not be greater than 1 N, and the normal breaking of the relay 100 may not be affected.

In some embodiments of the present disclosure, referring to FIG. 4, the moving contact 31 is provided with one of a matching protrusion 311 and a matching groove, and the bottom plate piece 321 is provided with the other one of the matching protrusion 311 and the matching groove (not shown). The matching protrusion 311 is in interference fit with the matching groove. Thus, the connection reliability between the moving contact 31 and the stationary contact 12 is improved. The structure is simple, and the assembly is easy. For example, the moving contact 31 is provided with the matching protrusion 311. The bottom plate piece 321 is provided with the matching groove. The matching protrusion 311 and the matching groove are connected by riveting.

In some embodiments of the present disclosure, referring to FIG. 4, the drive shaft 2 further includes a shaft body piece 22 and an insulating member 23. The insulating member 23 is connected between the support piece 21 and the shaft body piece 22. Thus, by arranging the insulating member 23, the high-voltage/low-voltage insulation between the support and the shaft body piece 22 may be achieved. For example, the formed support piece 21 and the shaft body piece 22 may be connected and fixed together by injection molding, thereby improving the connection strength between the support piece 21 and the shaft body piece 22.

In some embodiments of the present disclosure, referring to FIG. 4, the support piece 21 is provided with a mounting through hole 213. The insulating member 23 is matched with the mounting through hole 213. A positioning member 231 is arranged on an end of the insulating member 23 away from the shaft body piece 22 to position the elastic member 5. It may be appreciated that the positioning member 231 is arranged on the insulating member 23 to position the elastic member 5, which is conducive to preventing the deviation of the elastic member 5 during pressing, thereby ensuring the operation reliability of the relay 100.

For example, referring to FIG. 3 and FIG. 4, when the elastic member 5 and the moving contact assembly 3 are assembled, the elastic member 5 may be first mounted into the support piece 21. Then the riveted moving contact 31 and second magnetic yoke 32 may be snapped into the support piece 21, so that the sliding block 42 is matched with the sliding slot. Then two axial ends of the elastic member 5 are respectively snapped into a positioning hole on the second magnetic yoke 32 and the positioning member 231 on the insulating member 23. At this time, the elastic member 5 is in a compressed state, and the sliding block 42 is in abutting engagement with the first stop wall 411 under the action of the elastic member 5.

Furthermore, in some embodiments, as shown in FIG. 1, the other end of the drive shaft 2 is provided with a magnetic member 6 and a limiting member 7. A buffer spring 8 is arranged between the magnetic member 6 and the limiting member 7. Two ends of the buffer spring 8 respectively abut against the magnetic member 6 and the limiting member 7. Thus, the buffer spring 8 is arranged between the magnetic member 6 and the limiting member 7. When the drive shaft 2 is driven by the magnetic member 6 to move, it is necessary to overcome an elastic force of the buffer spring 8, so that the buffer spring 8 is elastically deformed. However, when the moving contact assembly 3 is electrically disconnected with the stationary contact 12, the magnetic member 6 may be pushed by an elastic restoring force of the elastic member 5 to drive the drive shaft 2 to move away from the stationary contact 12 under the action, so that the operation is simple, and the running is stable.

In an embodiment, referring to FIG. 1 and FIG. 2, a coil 9 may be wound outside the magnetic member 6. It should be noted that the relay 100 may be driven electromagnetically. The other end of the drive shaft 2 is provided with the magnetic member 6, and the coil 9 is wound outside the magnetic member 6. The relative movement between the drive shaft 2 and the housing 1 may be achieved by the electromagnetic drive to drive the moving contact assembly 3 to be communicated with the stationary contact 12. Moreover, the limiting member 7 is arranged, so that the movement distance of the drive shaft 2 may be limited to prevent the drive shaft 2 from moving too far. The damage of components in the relay 100 is avoided. The running stability and reliability of the relay 100 are improved.

In an embodiment, a limiting hole 71 is formed on at least one of the limiting member 7 and the magnetic member 6. The buffer spring 8 is arranged in the limiting hole 71. That is, the limiting hole 71 may be arranged on the limiting member 7. The buffer spring 8 is arranged in the limiting hole 71. The limiting hole 71 may be arranged on the magnetic member 6. The buffer spring 8 is arranged in the limiting hole 71. Thus, the fixed assembly of the buffer spring 8 is facilitated. Moreover, the deviation of the buffer spring 8 when being pressed may be prevented, thereby improving the running stability of the relay 100.

Other configurations and operations of the relay 100 according to an embodiment of the present disclosure are known to those of ordinary skilled in the art, and are not described in detail herein.

In the description of the present disclosure, it should be understood that orientation or position relationships indicated by the terms such as “center”, “longitudinal”, “transverse”, “length”, “width”, “thickness”, “up”, “down”, “vertical”, “horizontal”, “top”, “bottom”, “inside”, “outside”, “clockwise”, “counterclockwise”, “axial direction”, “radial direction”, and “circumferential direction” are based on orientation or position relationships shown in the accompanying drawings, and are used only for ease and brevity of illustration and description of the present disclosure, rather than indicating or implying that the mentioned apparatus or component needs to have a particular orientation or needs to be constructed and operated in a particular orientation. Therefore, such terms do not construe the limitations of the present disclosure.

In addition, the terms "first" and "second" are used merely for the purpose of description, and shall not be construed as indicating or implying relative importance or implying a quantity of indicated technical features. Therefore, a feature defined by "first" or "second" can explicitly or implicitly include one or more features. In the description of the present disclosure, unless otherwise specifically limited, "a plurality of" means two or more than two.

In the present disclosure, unless otherwise explicitly specified or defined, the terms such as "mount", "connect", "connection", and "fix" should be understood in a broad sense. For example, the connection may be a fixed connection, a detachable connection, or an integral connection; or the connection may be a mechanical connection, an electrical connection, or a communication; or the connection may be a direct connection, an indirect connection through an intermediary, or an internal communication between two components or a mutual action relationship between two components. A person of ordinary skill in the art may understand the specific meanings of the foregoing terms in the present disclosure according to specific situations.

In the present disclosure, unless otherwise explicitly specified or defined, the first feature being located "above" or "below" the second feature may be the first feature being in a direct contact with the second feature, or the first feature being in an indirect contact with the second feature through an intermediary. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may indicate that the first feature is directly below or obliquely below the second feature, or may merely indicate that the horizontal position of the first feature is lower than that of the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the present disclosure. In this specification, schematic representations of the foregoing terms are not necessarily directed to the same embodiment or example. Moreover, the specific features, structures, materials, or characteristics described may be combined in any one or more embodiments or examples in a suitable manner. In addition, different embodiments or examples described in this specification, as well as features of different embodiments or examples, may be integrated and combined by a person skilled in the art without contradicting each other.

Although the embodiments of the present disclosure have been shown and described, a person of ordinary skill in the art may understand that various changes, modifications, replacements, and variations may be made to the embodiments without departing from the principles and spirit of the present disclosure, and the scope of the present disclosure is as defined by the appended claims and their equivalents.

What is claimed is:

1. A relay, comprising:

a housing having a cavity defined in the housing;

a plurality of stationary contacts, arranged on the housing at intervals, each of the plurality of stationary contacts being at least partially arranged in the cavity;

a drive shaft movable relative to the housing in an axial direction of the drive shaft, an axial end of the drive shaft having a support piece at least partially inserted into the cavity;

a first magnetic yoke;

a moving contact assembly coupled with the support piece through a sliding structure, wherein the moving contact assembly is movable relative to the support piece in the axial direction of the drive shaft between a first position where the moving contact assembly contacting the stationary contacts and a second position where the moving contact assembly being away from the stationary contacts, the sliding structure is arranged on a side of the moving contact assembly along a moving direction of the moving contact assembly, the moving contact assembly comprises a moving contact and a second magnetic yoke, the first magnetic yoke is arranged on a first side of the moving contact facing the stationary contacts, and the second magnetic yoke is arranged on a second side of the moving contact facing away from the stationary contacts; and an elastic member, the elastic member being arranged between the moving contact assembly and the support piece and applying an elastic force to the moving contact assembly to move towards the first position.

2. The relay according to claim 1, wherein the sliding structure comprises:

a sliding slot, wherein one of the support piece and the moving contact assembly includes the sliding slot and comprises a first stop wall and a second stop wall respectively located at two ends of the sliding slot, wherein the sliding slot extends along the axial direction of the drive shaft; and a sliding block arranged on the other one of the support piece and the moving contact assembly, wherein the sliding block is coupled with the sliding slot and configured to slide between the first stop wall and the second stop wall along the axial direction of the drive shaft.

3. The relay according to claim 2, wherein the sliding slot is formed on the support piece, the sliding block is arranged on the moving contact assembly, and when the sliding block contacts the first stop wall under the elastic force of the elastic member, the moving contact assembly is moved to the first position.

4. The relay according to claim 3, wherein the support piece comprises two supporting arms arranged opposite to each other, the sliding slot is a first sliding slot, the sliding structure further comprises a second slide slot, the first sliding slot and the second sliding slot are formed in the two supporting arms respectively, the moving contact assembly is arranged between the two supporting arms, the moving contact assembly comprises two sliding blocks including the sliding block, and the two sliding blocks are respectively disposed in the first sliding slot and the second sliding slot.

5. The relay according to claim 1, wherein the first magnetic yoke is arranged in the cavity and spaced apart from the stationary contacts, the moving contact is mounted to the second magnetic yoke, the second magnetic yoke is coupled with the support piece through the sliding structure, and the elastic member is disposed between the second magnetic yoke and the support piece.

6. The relay according to claim 5, wherein the support piece defines a sliding cavity opened towards the first magnetic yoke, the moving contact assembly is movably coupled with the sliding cavity, an end of the first magnetic yoke facing the moving contact assembly does not extend over ends of the stationary contacts facing the moving contact assembly, a distance between the end of the first magnetic yoke facing the moving contact assembly and the ends of the stationary contacts facing the moving contact assembly in the axial direction of the drive shaft is L, and the L satisfies 0≤L≤1 mm.

7. The relay according to claim 6, wherein the second magnetic yoke comprises a bottom plate piece and two side plate pieces oppositely arranged on two sides of the bottom plate piece, a mounting groove is defined between the two side plate pieces and the bottom plate piece, the moving contact is arranged in the mounting groove, and an end of the moving contact facing the stationary contact is flush with an end of a side plate piece facing the first magnetic yoke.

8. The relay according to claim 7, wherein the moving contact comprises one of a matching protrusion and a matching groove, the bottom plate piece comprises the other one of the matching protrusion and the matching groove, and the matching protrusion fits with the matching groove.

9. The relay according to claim 1, wherein the drive shaft further comprises:

a shaft body piece; and an insulating member, the insulating member being connected between the support piece and the shaft body piece.

10. The relay according to claim 9, wherein a mounting through hole is formed on the support piece, the insulating member is coupled with the mounting through hole, and a positioning member is arranged on an end of the insulating member away from the shaft body piece to position the elastic member.

* * * * *